US012018576B2

(12) United States Patent
Godier et al.

(10) Patent No.: US 12,018,576 B2
(45) Date of Patent: Jun. 25, 2024

(54) ANNULAR ASSEMBLY FOR A TURBOMACHINE TURBINE

(71) Applicant: SAFRAN AIRCRAFT ENGINES, Paris (FR)

(72) Inventors: Rémi-Paul Honoré Godier, Moissy-Cramayel (FR); Etienne Gérard Joseph Canelle, Moissy-Cramayel (FR); Alexandre Corsaut, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/009,952

(22) PCT Filed: Jun. 10, 2021

(86) PCT No.: PCT/FR2021/051043

§ 371 (c)(1),
(2) Date: Dec. 12, 2022

(87) PCT Pub. No.: WO2021/250357

PCT Pub. Date: Dec. 16, 2021

(65) Prior Publication Data

US 2023/0340893 A1 Oct. 26, 2023

(30) Foreign Application Priority Data

Jun. 11, 2020 (FR) ....................................... 2006131

(51) Int. Cl.
*F01D 11/08* (2006.01)
*F01D 25/24* (2006.01)

(52) U.S. Cl.
CPC ............ *F01D 25/246* (2013.01); *F01D 11/08* (2013.01); *F05D 2240/11* (2013.01); *F05D 2240/55* (2013.01); *F05D 2260/30* (2013.01)

(58) Field of Classification Search
CPC .... F01D 11/001; F01D 11/003; F01D 11/005; F01D 11/008; F01D 9/04; F01D 9/041;
(Continued)

(56) References Cited

U.S. PATENT DOCUMENTS 5,188,507 A * 2/1993 Sweeney ............... F01D 25/246 415/173.1
7,866,943 B2 1/2011 Durand et al.
(Continued)

FOREIGN PATENT DOCUMENTS

FR 3 071 273 A1 3/2019

OTHER PUBLICATIONS

International Patent Application No. PCT/FR2021/051043, International Search Report and Written Opinion dated Oct. 15, 2021, 7 pgs.

(Continued)

*Primary Examiner* — Brian P Wolcott
*Assistant Examiner* — Maxime M Adjagbe
(74) *Attorney, Agent, or Firm* — Cozen O'Connor

(57) ABSTRACT

The present document relates to an annular assembly for a turbomachine turbine, in particular of an aircraft, said annular assembly extending about a longitudinal axis X and comprising: a distributor fixed to an external casing; a bladed disc mounted so as to rotate inside the external casing; said bladed disc being surrounded by a circumferentially segmented ring carried by the external casing and formed by a crown arranged radially on the outside of the bladed disc and by an annular deflector that is carried by an upstream edge of the crown and extends radially towards the inside from said upstream edge of the crown; characterized in that it comprises sealing members (56) between two circumferentially adjacent ring segments, these sealing members (56) comprising first circumferential sealing
(Continued)

means (58) between two circumferentially consecutive deflector segments.

9 Claims, 4 Drawing Sheets

(58) Field of Classification Search
CPC ............ F05D 2240/11; F05D 2240/55; F05D 2240/18
See application file for complete search history.

(56) References Cited

U.S. PATENT DOCUMENTS

| | | | | |
|---|---|---|---|---|
| 10,871,079 | B2 | 12/2020 | Delaporte et al. | |
| 11,035,244 | B2 | 6/2021 | Morliere et al. | |
| 2005/0002779 | A1 | 1/2005 | Tanaka | |
| 2016/0003079 | A1* | 1/2016 | Boeke | F01D 11/005 415/170.1 |
| 2018/0347399 | A1* | 12/2018 | Synnott | F01D 9/04 |

OTHER PUBLICATIONS

French Patent Application No. 2006131; Search Report dated Jan. 21, 2021; 6 pgs.

* cited by examiner

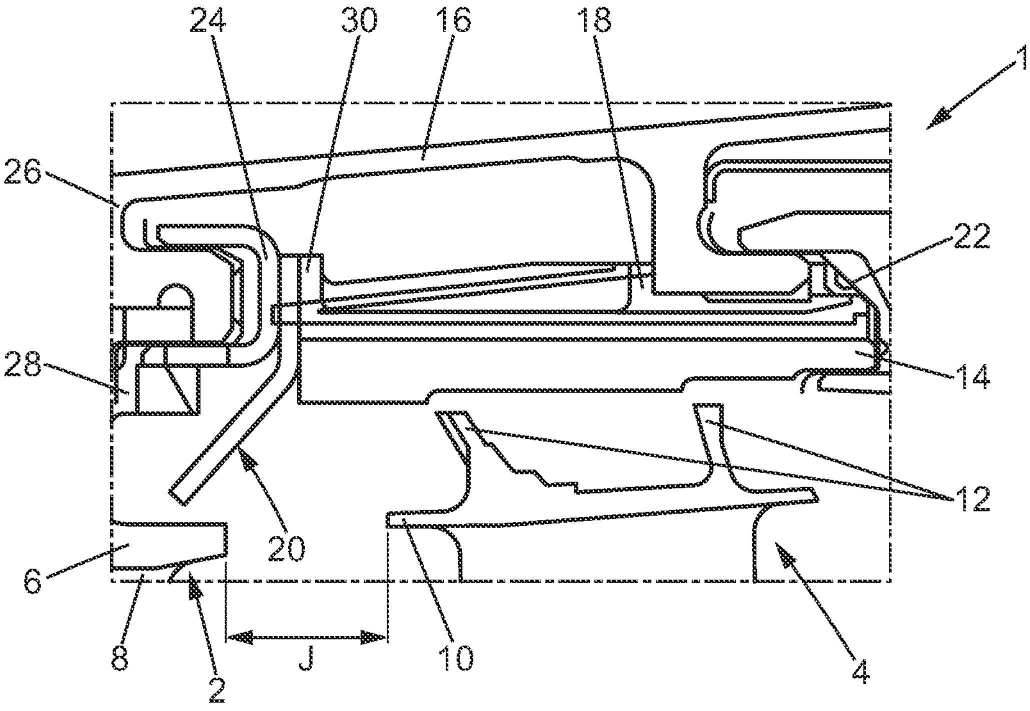
FIG. 1
FIG. 2
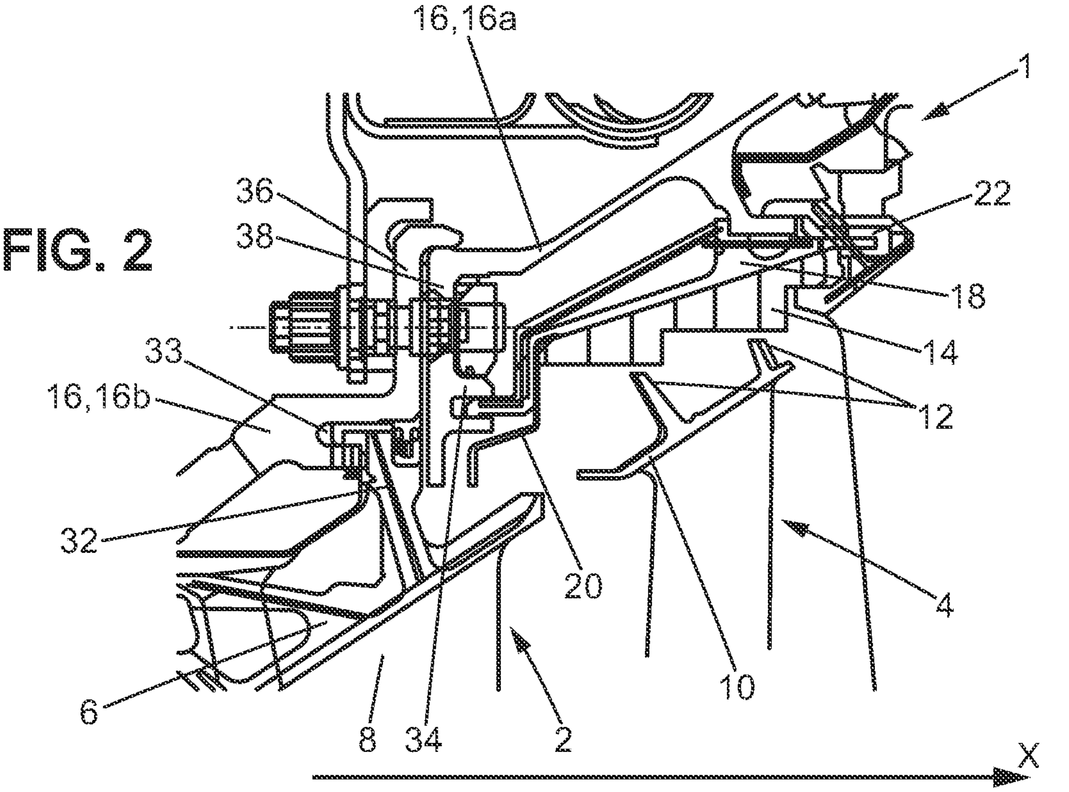

FIG. 5
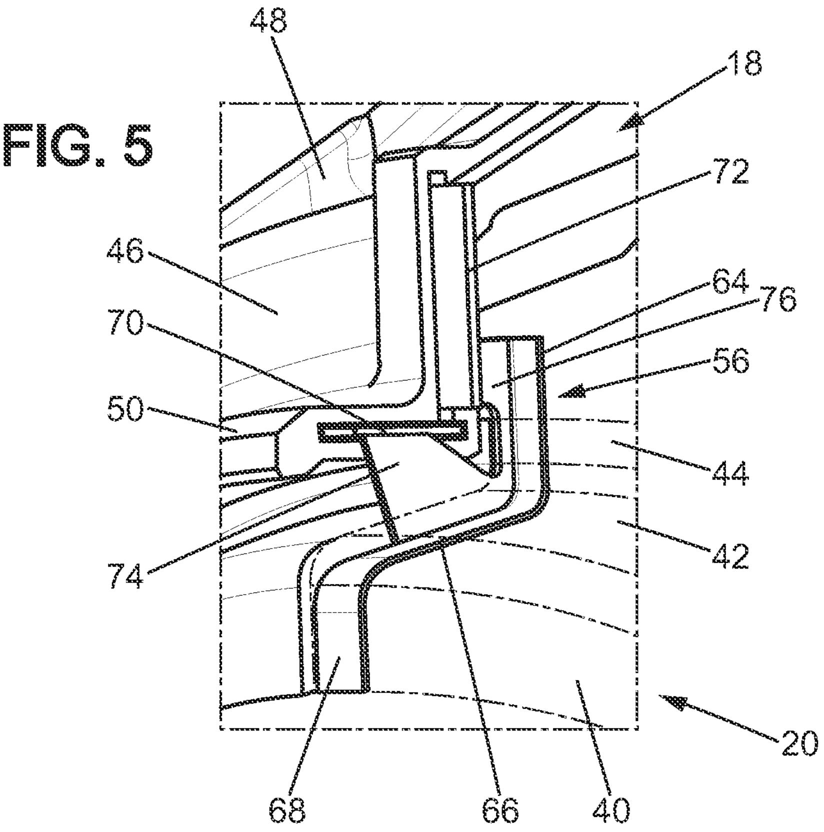
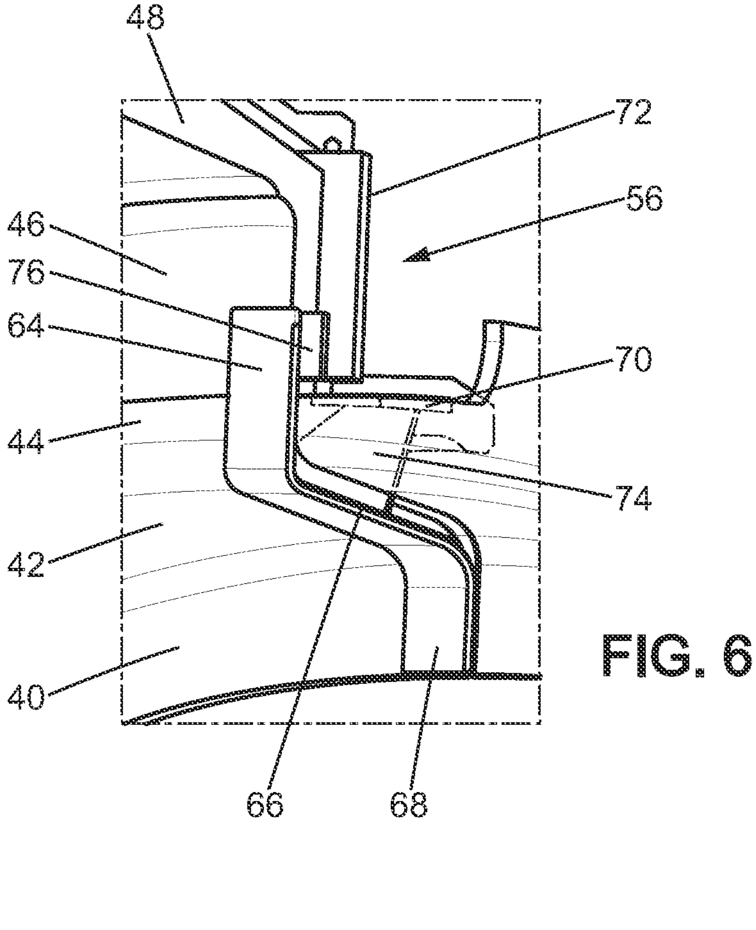
FIG. 6

ANNULAR ASSEMBLY FOR A TURBOMACHINE TURBINE

CROSS-REFERENCE TO RELATED APPLICATIONS

This application is a 35 U.S.C. § 371 filing of International Application No. PCT/FR2021/051043 filed Jun. 10, 2021, which claims the benefit of priority to French Patent Application No. 2006131 filed Jun. 11, 2020, each of which is incorporated herein by reference in its entirety.

TECHNICAL FIELD OF THE INVENTION

The present document relates to a sealing member for a turbomachine, and more particularly for a low-pressure turbine.

PRIOR ART

Generally, a turbomachine is formed, from upstream to downstream, by a low-pressure compressor, a high-pressure compressor, a combustion chamber, a high-pressure turbine and a low-pressure turbine. The low-pressure turbine makes it possible to exploit and release the power generated in a combustion chamber located upstream of the low-pressure turbine. Two air flows need to be considered inside a turbomachine: a primary annular flow and a secondary annular flow. The secondary flow bypasses all of the hot parts of the turbomachine. The other flow, referred to as the primary flow, passes through the whole turbomachine from the low-pressure compressor to the low-pressure turbine and is surrounded by the secondary air flow. This primary flow circulates in a primary flow duct.

A turbine comprises alternating annular rows of stator blades and moving blades arranged inside a casing. FIG. 1 illustrates a part of such a turbine 1 and shows an upstream distributor 2 and a downstream annular row of moving blades 4.

The distributor 2 includes an outer annular platform 6 fixed to a radial blade 8. The row of moving blades 4 includes an outer annular platform 10 from which lugs 12 extend radially outwards, which cooperate in a sealing manner with an abradable 14, for example in the form of a honeycomb, belonging to a segmented ring supported by the casing 16, as shown in FIG. 1.

The circumferentially segmented ring comprises a crown 18 supporting the abradable 14 on its radially inner face 14. The ring also comprises a thermal deflector 20 supported by the upstream end of the crown 18. The crown 18 is fixed to the turbine casing 16 by a C-shaped clamping tab 22 integral with the upstream end of an outer platform of the distributor arranged downstream of the moving wheel. The upstream end of the crown comprises a C-shaped member 24 for fixing the ring to a cylindrical rail 26 of the casing 16 and to a radial arm 28 of the upstream distributor 2. The deflector 20 is attached to an upstream edge 30 of the crown 18 and extends radially to the interior.

When the turbomachine is in operation, the combustion gases pass from upstream to downstream in the primary duct of the turbine and a portion of the hot combustion air can escape between the downstream end of the outer platform 6 of a distributor 2 and the upstream end of the outer platform 10 of a downstream moving wheel 4. The annular space formed in this way and marked J corresponds to space required for the rotation of the moving wheel. To limit the passage of hot air between two crown segments 18, tabs are used which are partly engaged in a crown segment 18 and partly in a circumferentially adjacent crown segment 18. However, air can still circulate between two segments of the deflector 20 and damage the attachments of the ring to the casing, i.e. the C-shaped member 24, the cylindrical rail 26 of the casing 16, the radial arm 28 of the upstream deflector 20 and also the casing 16 itself. The use of tabs is not feasible since the thickness of the deflector is far too small to be able to consider such a solution.

The present document aims to address these disadvantages in a reliable, effective and inexpensive manner.

DISCLOSURE OF THE INVENTION

The present document relates to an annular assembly for a turbomachine turbine, in particular of an aircraft, said annular assembly extending in an axial direction X and comprising:

- a distributor fixed to an external casing;
- a bladed disc arranged downstream of the distributor and mounted so as to rotate inside the external casing;
- said bladed disc being surrounded by a circumferentially segmented ring and supported by the external casing and formed by a crown arranged radially to the exterior of the bladed disc and an annular deflector supported by an upstream edge of the crown and extending radially towards the interior from said upstream edge of the crown, characterized in that it comprises sealing members between two circumferentially adjacent ring segments, these sealing members comprising first circumferential sealing means between two circumferentially consecutive deflector segments.

This sealing member provides an improved aerothermal seal between the thermal deflector segments. The sealing member makes it possible to thermally protect the casing by preventing the leakage of hot combustion gases from circumferential junctions of the thermal deflector segments.

The first circumferential sealing means can be arranged at the junction between two circumferentially consecutive deflector segments.

The sealing members may comprise second circumferential sealing means between two circumferentially consecutive crown segments, these second sealing means being joined to the first sealing means.

The second sealing means make it possible to prevent the leakage of combustion gases between two circumferentially consecutive crown segments. The connection of the second sealing means to the first sealing means makes it possible to facilitate the assembly of said sealing member. The circumferential seal between two crown segments is thus achieved simultaneously with sealing between two circumferentially consecutive deflector segments, thus avoiding assembly errors.

The first sealing means may comprise a wall element applied from downstream to the circumferentially facing ends of two circumferentially consecutive deflector segments.

The design of the first sealing means as a wall element removes any doubt about the presence of the sealing member during an endoscopic inspection. This design also eliminates the risk of omitting to assemble the sealing members and also the risk of fitting them in the wrong direction. The shape of these members also ensures error-proofing when they are mounted between two ring segments.

The second sealing means can comprise at least one first plate and one second plate which are disconnected and connected to the first sealing means, the first plate and the second plate being engaged in a slot of an edge of a first crown segment and for another part in a slot of an edge circumferentially facing a second circumferentially adjacent crown segment.

It is understood that the connection of the plates to the first means avoids the possibility of the plates being assembled incorrectly as they are mounted between two ring segments simultaneously with the first means.

Each sealing member may comprise a first connecting element connecting a first plate to the wall element, this first connecting element being interposed circumferentially between two edges of circumferentially adjacent deflector segments.

Each sealing member may comprise a second connecting element connecting a second plate to the wall element, this second connecting element being interposed circumferentially between two edges of circumferentially adjacent crown segments.

These first and second connecting elements make it possible to confer robustness and solidity to said sealing member. These first and second connecting elements make it possible to facilitate the assembly direction of said sealing member.

These first and second connecting elements make it possible to mechanically hold the first sealing means on the second sealing means.

The second connecting element can be arranged radially to the exterior of two edges of circumferentially adjacent deflector segments.

The present document relates to a turbomachine turbine comprising a low-pressure turbine including an annular assembly according to the aforementioned features and a high-pressure turbine, the external casing of the low-pressure turbine comprising an upstream annular flange for attachment to a downstream annular flange of an external casing of the high-pressure turbine.

The present document relates to a turbomachine comprising an annular assembly of the aforementioned type.

BRIEF DESCRIPTION OF THE FIGURES

FIG. 1 shows a partial schematic half-view in axial cross-section of a turbomachine module;

FIG. 2 shows a partial schematic half-view in an axial cross-section of a turbomachine module according to the invention;

FIG. 5 shows a schematic perspective view of a sealing member mounted in a ring segment viewed from the side, according to the invention;

FIG. 6 shows a schematic perspective view of a sealing member mounted in a ring segment viewed from downstream, according to the invention;

DETAILED DESCRIPTION OF THE INVENTION

Figure 3:
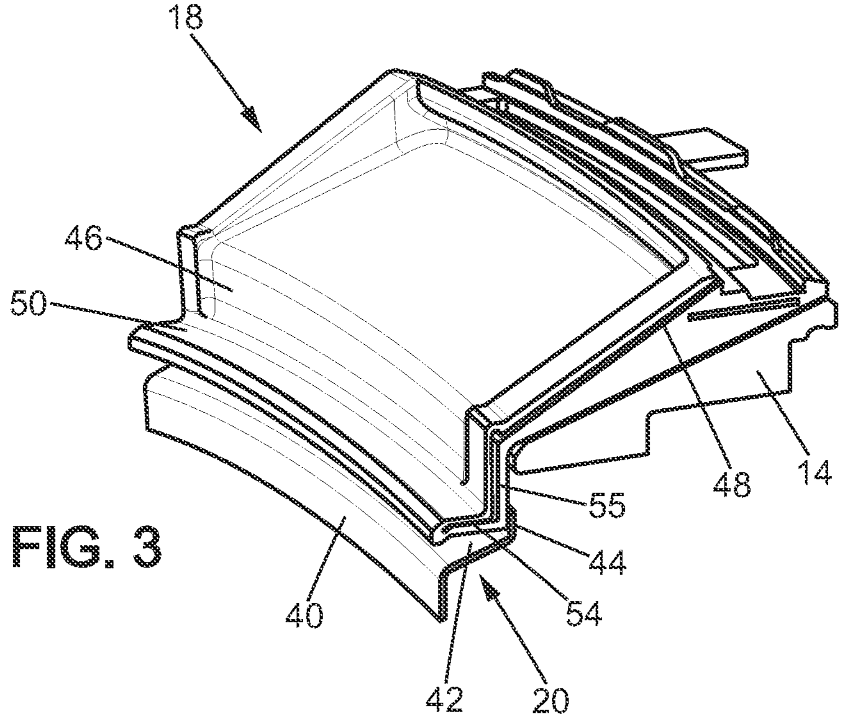
FIG. 3 shows a schematic perspective view of a sealing ring segment of the module of FIG. 2, according to the invention.

A turbine comprises an upstream high-pressure turbine and a downstream low-pressure turbine. The high-pressure turbine and the low-pressure turbine each comprise alternating annular rows of stator blades and moving blades arranged inside a casing. As illustrated in FIG. 2, a first downstream moving bladed wheel 4 is surrounded externally by a low-pressure turbine casing 16*a*, while an upstream outlet distributor 2 of the high-pressure turbine is surrounded externally by a casing of the high-pressure turbine 16*b*. The distributor 2 has an outer annular platform 6 to which radially outer ends of radial blades 8 are connected. A hooking tab 32 is at one end of said external platform 6 of the distributor 2. The circumferential and axial retention of the distributor 2 is ensured by means of said hooking tab 32, which is engaged in an annular groove 33 of the high-pressure turbine casing 16*b*, this annular groove 33 opening in downstream direction.

This high-pressure turbine casing 16*b* is fixed at its downstream end by means of an annular flange 36 to an annular flange 38 of the upstream end of the low-pressure turbine casing 16*a*. The annular flanges 36, 38 are positioned radially at the annular space separating the high-pressure outlet distributor 2 of the turbine and the first low-pressure moving wheel 4 of the turbine.

As illustrated in FIG. 2, the first moving blade wheel 4 is rotatably mounted about a longitudinal axis X in a ring attached to the external casing 16*a* of the low-pressure turbine. The segmented ring is formed by a plurality of ring segments which are arranged circumferentially end to end and are each supported by the external casing 16*a* of the low-pressure turbine. The downstream ends of the ring segments are clamped radially by a C-shaped clamping tab 22, located downstream of the ring segments.

As illustrated in FIGS. 3 to 6, each ring segment comprises a crown segment 18 arranged radially outside the blade wheel 4 and an annular thermal deflector segment 20.

The deflector segment 20 is generally z-shaped and has a substantially curved orientation. The deflector segment 20 includes, from upstream to downstream, a radially inwardly extending wall segment 40, an annular wall segment 42 and a radially outwardly extending wall segment 44. The radially outwardly extending wall segment 44 is fixed by soldering to a downstream edge of a radial wall 46 of the crown segment 18. The annular wall segment 42 of the deflector segment 20 circumferentially follows the direction of extension of the crown segment 18. The deflector segment 20 has a circumferential extension substantially identical to that of the crown segment 18 and the abradable 14 such that the circumferential ends of the deflector segment 20 are substantially axially aligned with those of the crown segment 18 and the abradable 14. This deflector segment 20 may be an annular sheet metal segment.

Figure 4:
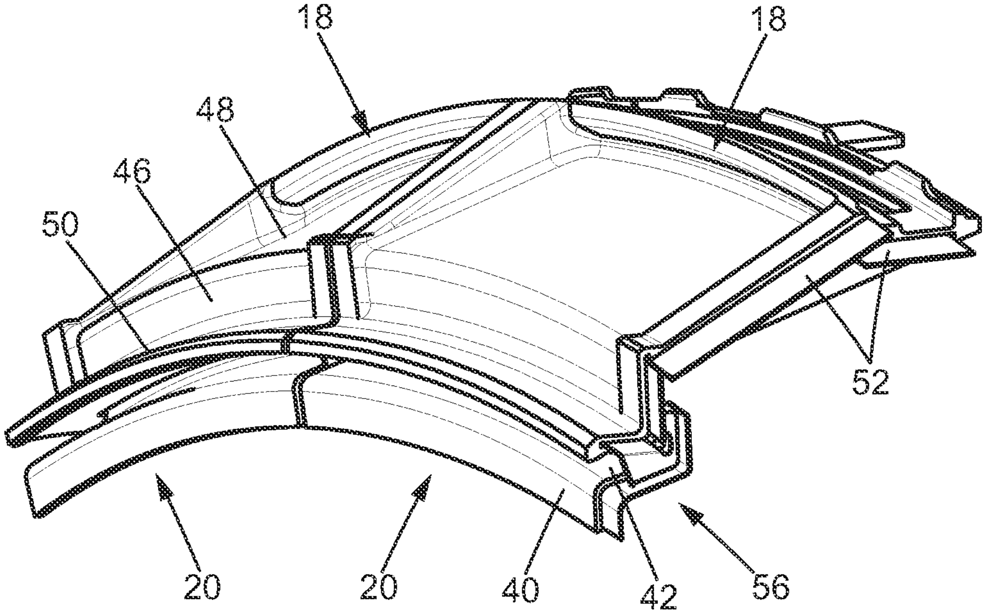
FIG. 4 shows a schematic perspective view of two circumferentially consecutive ring segments and a sealing member, according to the invention.
Figure 7:
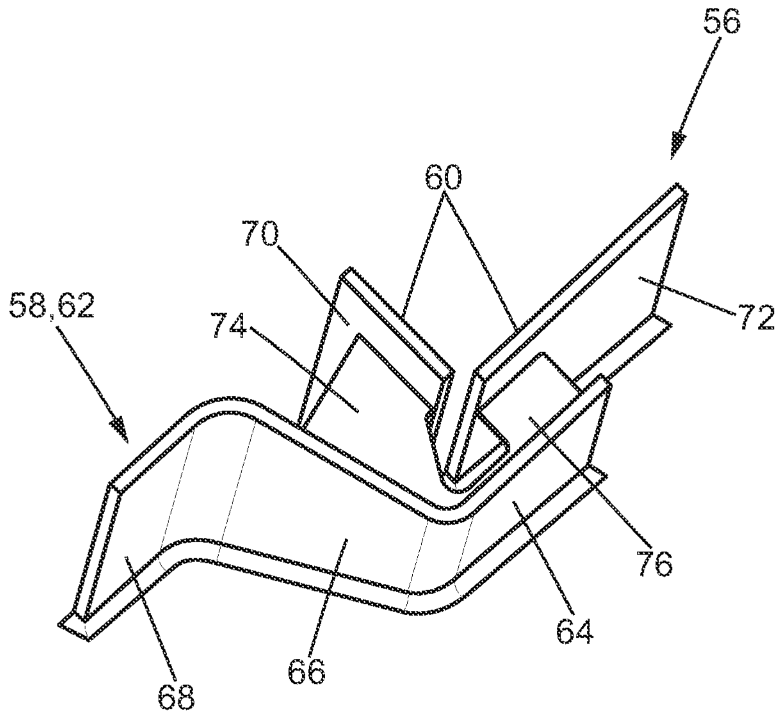
FIG. 7 shows a schematic perspective view of a melt-in-place sealing member according to the invention.

As illustrated in FIGS. 2 to 6, the crown segment 18 extends circumferentially and comprises an annular wall segment 48 which bears an abradable 14 on its inner face, a radially inwardly extending wall segment 46 connected to a cylindrical wall segment 50 engaged in an annular groove 34 carried by the annular flange 38 of the upstream end of the low-pressure turbine casing 16*a*. The abradable 14 is in the form of a honeycomb and seals the blade wheel 4 by means of annular lugs 12 extending radially outwardly from the outer annular platform 10 of the bladed wheel 4, so as to limit the passage of air radially outwardly of the moving wheel 4. Typically, as illustrated in FIG. 4, sealing tabs 52 are inserted in longitudinal slots located in the longitudinal edges of the circumferential ends of the annular wall segment 48 of the crown segment 18. These sealing tabs 52 are each inserted on a first side into a slot of a longitudinal edge of a circumferential end of an annular wall segment 48 of a first crown segment 18 and on a second side of said sealing tab 52 into a slot of a longitudinal edge of a circumferential end of an annular wall segment 48 of a second circumferentially consecutive crown segment 18. These sealing tabs 52 are generally planar and elongated in shape.

As illustrated in FIG. 3, radial edges of the circumferential ends of the radial wall segment 46 of the crown segment 18 and longitudinal edges of the circumferential ends of the cylindrical wall segment 48 of the crown segment 18 have slots 54, 55 for receiving a sealing member.

As illustrated in FIGS. 4 to 7, the sealing member 56 comprises first circumferential sealing means 58 between two circumferentially consecutive deflector segments 20, i.e. at the junction between two circumferentially consecutive deflector segments 20. It may also comprise second sealing means 60 between two circumferentially consecutive crown segments 18.

The first sealing means 58 comprise a wall element 62 having a downstream radial wall 64 extending radially outwardly and the radially inner end of which is connected to an inclined wall 66 converging towards the axis of rotation in an upstream direction, said inclined wall 66 being connected at its upstream end to an upstream radial wall 68 extending radially towards the interior.

This wall element 62 is shaped identically to the thermal deflector segments 20 so that it can perfectly match the three-dimensional form of two circumferentially facing edges of the deflector segments 20.

The second sealing means 60 between two circumferentially consecutive crown segments 18 comprise a first plate 70 and a second plate 72 which are disconnected. These first 70 and second 72 plates have a flat, substantially rectangular shape. The first plate 70 is suitable for inserting on a first side into a slot 54 of an edge of a circumferential end of a cylindrical wall segment 50 of a first crown segment 18 and on second side, opposite the first side, into a slot 54 of an edge of a circumferential end of a cylindrical wall segment 50 of a second circumferentially consecutive crown segment 18. The second plate 72 can be inserted from a first side into a slot 55 of a radial edge of a circumferential end of a radial wall segment 46 of a first crown segment 18 and from a second side, opposite the first side, into a slot 55 of a radial edge of a circumferential end of a radial wall segment of a second circumferentially consecutive crown segment 18.

The sealing member 56 includes a first connecting element 74 connecting the first plate 70 to the inclined wall 66 converging towards the axis of rotation in an upstream direction of the wall element wall 62. The first connecting element 74 extends radially with a substantially frustoconical shape with a radially inwardly flaring cross-section. This first connecting element 74 is attached at its radially inner end to the wall element 62 and its radially outer end to the inner face of the first plate 70. The first connecting element 74 extends radially and longitudinally.

The sealing member 56 also comprises a second connecting element 76 connecting the second plate 72 to the downstream radial wall 64 extending radially outwards of the wall element 62. The second connecting element extends longitudinally with a substantially rectangular shape. This second connecting element 76 is attached at its radially inner end to the wall element 62 and its radially outer end to the inner face of the second plate 72. The second connecting element 76 can extend radially up to one third of a radial length of the second plate 72 from an inner end of the second plate 72.

The first connecting element 70 and the second connecting element 72 are planar and have thickness of between 0.2 and 0.4 mm. This thickness is of the same order of magnitude as that of the first and second sealing means.

This sealing member 56 can be manufactured by additive manufacturing. Said sealing member 56 is mounted in circumferential translation, the radially outer face of said wall element 62 matching the shape of the downstream face of the thermal deflector segment 20, the first 70 and second 72 plates being inserted into said slots 54, 55 of the housings of two circumferentially consecutive crown segments 18.

The present document is of particular interest in the context in which it is used, i.e. at the junction between the high-pressure casing 16*b* and low-pressure casing 16*a* since this junction area of the casings may be more susceptible to leaking hot air than any other, as the fastening elements could be affected and differential thermal expansion between the two casings may lead to increased stress in the latter at their attachment point.

The sealing member 56 prevents combustion gases from passing through the circumferential and radial clearances between two circumferentially consecutive crown segments 18 and between two consecutive deflector segments 20.

The sealing member 56 makes it possible to block air in the gap between the first 70 and the second 72 plate which are disconnected.

The joining of the second sealing means 60 to the first sealing means 58 makes it possible to facilitate the assembly of said sealing member 56. The circumferential seal between two crown segments 18 is thus performed simultaneously with sealing between two circumferentially consecutive deflector segments 20 thus avoiding errors of omission during assembly.

The design of the first sealing means 58 in the form of a wall element 62 eliminates all doubt about the presence of the sealing member 56 during an endoscopic inspection.

The invention claimed is:

1. An annular assembly for a turbomachine turbine, said annular assembly extending about a longitudinal axis X and comprising:

a distributor (2) fixed to an external casing (16);

a bladed wheel (4) arranged downstream of the distributor (2) and mounted so as to rotate inside the external casing (16);

said bladed wheel (4) being surrounded by a circumferentially segmented ring supported by the external casing (16), the circumferentially segmented ring being formed by a plurality of crown segments (18) arranged radially to an exterior of the bladed wheel (4) and a plurality of annular deflector segments (20) supported by an upstream edge of a respective crown segment (18) of said plurality of crown segments, each annular deflector segment of said plurality of annular deflector segments extending radially towards an interior from said upstream edge of said respective crown segment (18), wherein the plurality of crown segments comprises two circumferentially consecutive crown segments and the plurality of annular deflector segments comprises two circumferentially consecutive deflector segments;

wherein the annular assembly comprises sealing members (56) comprising first circumferential sealing means (58) arranged at junction between said two circumferentially consecutive deflector segments (20) and second circumferential sealing means (60) between said two circumferentially consecutive crown segments (18), the second sealing means (60) being connected to the first sealing means (58), wherein the first sealing means (58) comprises a wall element (62), wherein the second sealing means (60) comprises a first plate (70) and a second plate (72) which are disconnected from each other and each connected to the first sealing means (58), the first plate (70) and the second plate (72) being engaged in respective first slots (54, 55) of a first edge of a first crown segment (18) of said two circumferentially consecutive crown segments, and the first plate (70) and the second plate (72) being engaged in respective second slots (54, 55) of a second edge of a second crown segment (18) of said two circumferentially consecutive crown segments, the first edge circumferentially facing the second edge, wherein each sealing member (56) comprises a first connecting element (74) connecting the first plate (70) to the wall element (62), the first connecting element (74) being interposed circumferentially between two edges of circumferentially consecutive deflector segments (20).

2. The annular assembly according to claim 1, wherein the wall element (62) is applied from downstream to edges of the two circumferentially consecutive deflector segments (20).

3. The annular assembly according to claim 1, wherein each sealing member (56) comprises a second connecting element (76) connecting the second plate (72) to the wall element (62), the second connecting element (76) being interposed circumferentially between two edges of the circumferentially consecutive crown segments (18).

4. The annular assembly according to claim 3, wherein said second connecting element (76) is arranged radially outside of two edges of circumferentially consecutive deflector segments (20).

5. A turbomachine turbine comprising a low-pressure turbine including the annular assembly according to claim 1 and an external casing; and a high-pressure turbine comprising an external casing, the external casing of the low-pressure turbine comprising an upstream annular flange (36) for attachment to a downstream annular flange (38) of the external casing of the high-pressure turbine.

6. A turbomachine comprising the annular assembly according to claim 1.

7. The annular assembly according to claim 1, wherein the wall element (62) has a downstream radial wall (64) extending radially outwardly, the downstream radial wall (64) having a radially inner end which is connected to an inclined wall (66) converging towards the longitudinal axis in an upstream direction, said inclined wall (66) having an upstream end connected to an upstream radial wall (68) extending radially towards the longitudinal axis.

8. The annular assembly according to claim 7, wherein the first connecting element (74) connects the first plate (70) to the inclined wall (66) of the wall element (62).

9. The annular assembly according to claim 8, wherein each sealing member (56) comprises a second connecting element (76) connecting the second plate (72) to the downstream radial wall (64) of the wall element (62).

* * * * *